(12) United States Patent
Agtuca

(10) Patent No.: US 8,772,955 B2
(45) Date of Patent: Jul. 8, 2014

(54) COLLAPSIBLE HORIZONTAL AXIS WIND GENERATOR

(76) Inventor: Pete Agtuca, Auburn, WA (US)

(*) Notice: Subject to any disclaimer, the term of this patent is extended or adjusted under 35 U.S.C. 154(b) by 39 days.

(21) Appl. No.: 13/162,022

(22) Filed: Jun. 16, 2011

(65) Prior Publication Data

US 2012/0242084 A1    Sep. 27, 2012

Related U.S. Application Data

(60) Provisional application No. 61/425,628, filed on Dec. 21, 2010, provisional application No. 61/355,314, filed on Jun. 16, 2010.

(51) Int. Cl.
*F03D 9/00* (2006.01)
*H02P 9/04* (2006.01)
*F03D 7/02* (2006.01)
*F03D 1/06* (2006.01)

(52) U.S. Cl.
CPC ............ *F03D 1/0675* (2013.01); *F03D 7/0236* (2013.01); *Y02E 10/723* (2013.01); *Y02E 10/721* (2013.01); *Y02B 10/30* (2013.01); *H02P 9/04* (2013.01)
USPC ........................................................ 290/44

(58) Field of Classification Search
CPC ... F03D 1/0675; F03D 7/0236; Y02E 10/723; Y02E 10/721; Y02B 10/30; H02P 9/04
USPC ............... 290/44, 43, 55, 54; 416/132 B, 133
See application file for complete search history.

(56) References Cited

U.S. PATENT DOCUMENTS 7,396,207 B2 * 7/2008 DeLong .......................... 416/87
2008/0246284 A1 * 10/2008 Pelman et al. ................... 290/55

* cited by examiner

*Primary Examiner* — Javaid Nasri
(74) *Attorney, Agent, or Firm* — Dean A. Craine

(57) ABSTRACT

A low wind, lightweight horizontal axis wind generator with two adjustable rotor assemblies that include at least one set of lightweight blades that can be manually or automatically unfurled or furled in low, moderate and high winds. In one embodiment, each blade has an airfoil shape in cross-sectional with a rounded leading edge and a thin tailing edge. In a second embodiment, each blade is sail shaped made of one thin cover or panel that assumes a concave cup-like configuration in the wind. In both embodiments, the blade are made of lightweight flexible material supported by an inner frame. In one embodiment, the cover moves longitudinally over the inner frame. In the second embodiment, the cover moves laterally over the inner frame. The unfurling and furl of the blades are controlled by a voltage sensor that constantly measures the voltage output of the generator and/or by wind sensors.

6 Claims, 20 Drawing Sheets

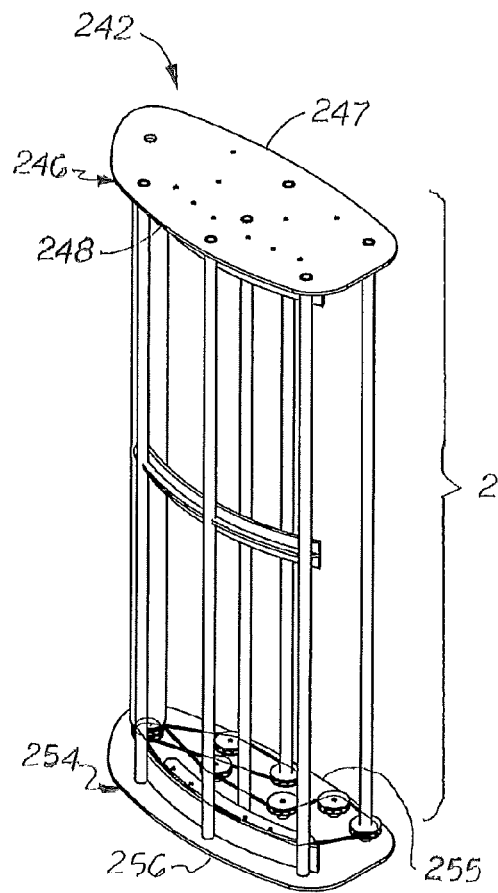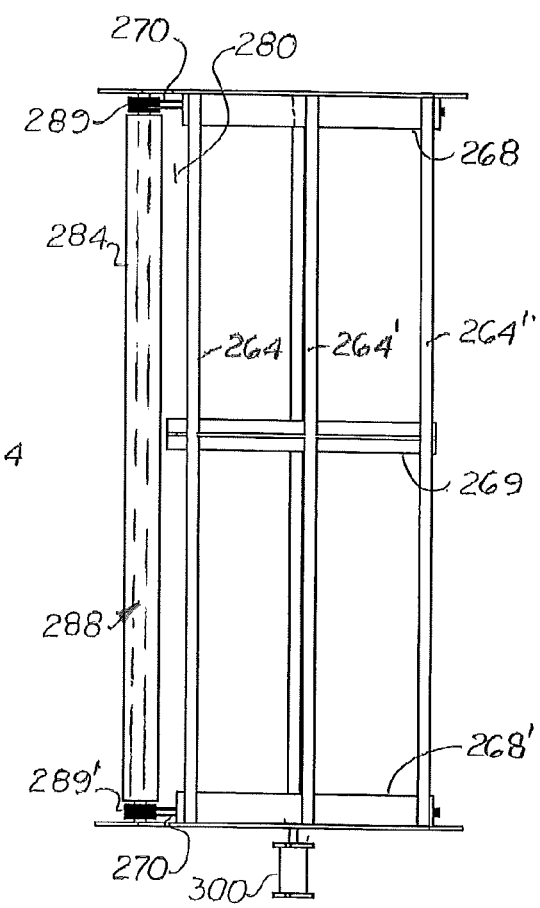
FIG. 15                    FIG. 16

COLLAPSIBLE HORIZONTAL AXIS WIND GENERATOR

This utility patent application is based on and claims the filing date benefits of U.S. provisional patent applications (61/355,314, filed Jun. 16, 2010) and (61/425,628, filed Dec. 21, 2010).

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to wind generators, and more specifically to scalable wind generators used in low to high velocity winds.

2. Description of the Related Art

Wind power is widely accepted as an environmental friendly means for producing energy. Unfortunately, wind generators available today use large and expensive turbine generators mounted at a fixed position on the end of a large pole or tower. Horizontal axis wind generators (known as HAWGs) typically use two to three large, variable pitch rotors or blades connected to a horizontally aligned generator. Mounted on the pole is a yaw drive and yaw motor that turn the generator so the rotors constantly face the wind. Ideally, HAWG's should be operated in areas that experience constant, moderate winds 16 to 25 mph. When winds exceed 40 mph, the generators are rotated away from the wind and the rotors pitched to minimize lift. Brakes are used to slow down and impede rotation of the generator.

One drawback with HAWG generators is they must be stopped during high winds. Another drawback is HAWG generators are large structures that require large supporting poles or towers to hold the generator and blades in an elevated position above the ground and away from other objects. Because of their size, they are difficult to install, visually obtrusive and expensive. They are not well suited for low wind environments, densely populated areas, scenic viewing areas, or in areas where the direction of the wind varies greatly.

What is needed is a relatively low cost, scalable, horizontal axis wind generator that can be used in low to moderate wind environments, safely mounted and operated on the ground, a roof, or a pole, and that it automatically adjust to a protective configuration during moderate to high wind conditions.

SUMMARY OF THE INVENTION

A low wind, lightweight horizontal axis wind generator with collapsible rotors is disclosed. The wind generator includes a low RPM electric generator rotatably mounted on the end of a vertical pole and designed to turn around the pole's longitudinally axis and over the end of the pole so the rotors are perpendicularly aligned with the changing directions of the wind. In front of the electric generator and attached to the electric generator's drive shaft is a rotor with a plurality radially aligned collapsible blades. In one embodiment, the blades are formed on two stacked rotor assemblies that include at least two lightweight, collapsible blades. Extending horizontally from the rear of the generator is an optional support rod with a rudder attached thereto that automatically rotates the wind generator into the wind. An optional yaw motor may be provided to supplement movement of the wind generator into the wind.

In the embodiment, the blades on the two sets of rotor assemblies are offset so that when the blades on both sets of rotor assemblies are extended, they are evenly distributed around the rotor plate. When the blades on one set of rotor assembly are collapsed, the blades on the other rotor assembly may also be collapsed or extended.

In one embodiment, each blade includes a hollow, flexible body that has an airfoil cross-sectional shape with a rounded leading edge and a thin tailing edge. Each blade is rotated on its longitudinal axis 2 to 10 degrees. In one embodiment, each blade is designed to extend and collapse along its longitudinally axis. The flexible body may be made of durable nylon or similar film-like material supported by one or more rods that extend radially outward from the rotor plate. In one embodiment, the flexible body is attached to a guide plate that moves longitudinally over the fixed rod. By moving the guide plate along the fixed rod, the flexible body on each blade can be extended or collapsed.

During development, it was discovered that by using blades made of thin flexible material that selectively unfurls and furls from a spool or roll aligned longitudinally on one side of the blade, the exposed surface area of each blade may be controlled enabling the generator to be used in larger wind conditions. In another embodiment, each blade includes a flexible panel made of nylon or similar film-like material mounted on a spool or axle in one side of the blade's rigid frame. During use, the spool or axle selectively rotates and furls and unfurls the panel laterally over the rigid frame which changes the exposed surface area of each blade and changes the rotational velocity of the generator. Wind and voltage sensors automatically cause the panel of each blade to furl and unfurl during use.

During low winds (3 to 15 mph), both sets of rotors may be extended thereby maximizing the electrical energy produced by the wind. During moderate winds (16 to 25 mph), at least one set of blades on one rotor assembly is collapsed and the other set of blades on the other rotor assembly is extended reducing the number blades exposure and to shear stressor produced by the wind. During high winds (above 25 mph), the sets of blades on both rotor assemblies are collapsed protecting the entire system.

The extending and retracting movement of the blades in the two sets of rotor assemblies for each embodiment are controlled by a voltage sensor that constantly measures the voltage output of the generator. The voltage sensor is connected to at least two electric motors mounted on the rotor plate that controls the movement of cables that causes the guide plates to move inward and outward over the outer rod. When the output voltage is below or above predetermined voltages set by the operator, the two electric motors that control one or both sets of blades on the rotor assemblies are activated to extend or collapse the blades, respectively.

DESCRIPTION OF THE DRAWINGS

FIG. 15 is a perspective view of one blade used in the second embodiment of the wind generator showing the panel furled into a roll on one side of the blade frame.

FIG. 16 is a front elevational view of the blade shown in FIG. 15.

DESCRIPTION OF THE PREFERRED EMBODIMENT(S)

Figure 1:
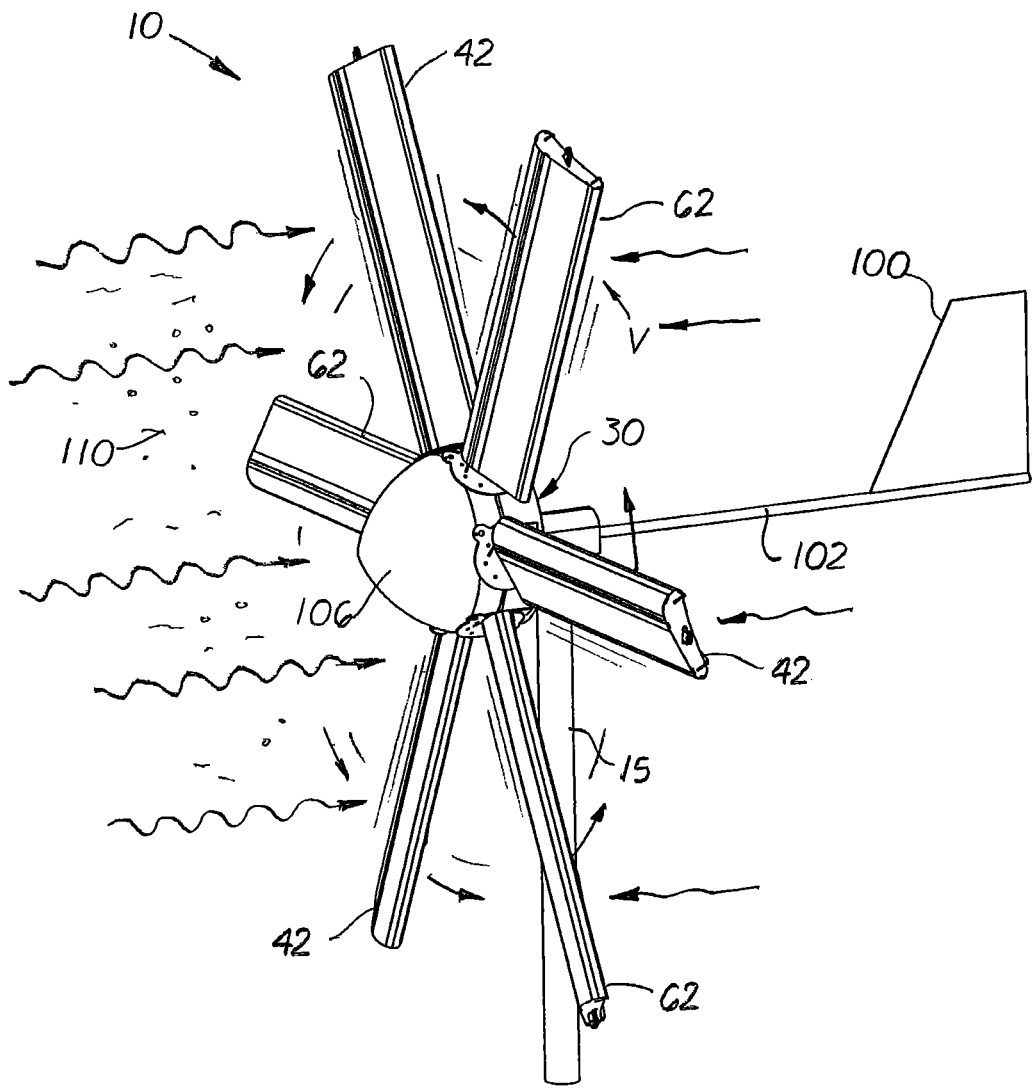
FIG. 1 is a perspective view of the collapsible horizontal axis wind generator with all of the blades in an extended position.

Referring to the accompanying FIGS. 1-23, there is shown a low wind, lightweight horizontal axis wind generator, generally indicated by the reference number 10, with two sets of collapsible rotor assemblies 40 and 60. The wind generator 10 includes a high torque, low RPM electric generator 30 rotatably mounted on the end of a vertical pole 15 and designed to turn and face the wind 110 when operating. Attached to the electric generator's drive shaft 32 is rotor plate 70 with the two sets of collapsible rotors assemblies 40, 60, mounted thereon. Extending horizontally from the rear of the generator 30 is a horizontal support 102 with a rudder 100 designed to rotate the wind generator 10 into the wind 110.

Figure 9:
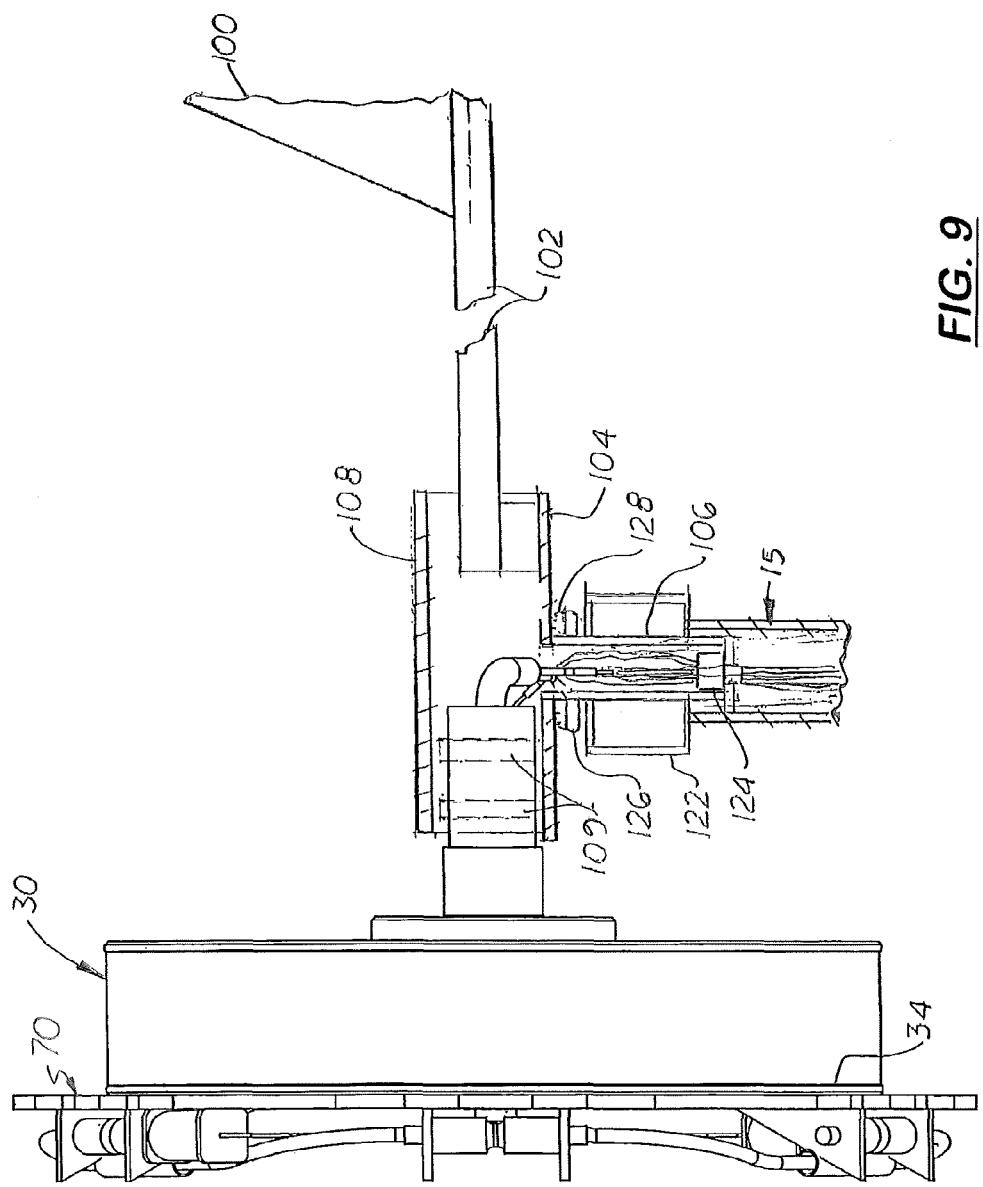
FIG. 9 is a partial, sectional side elevational view of the wind generator.
Figure 10:
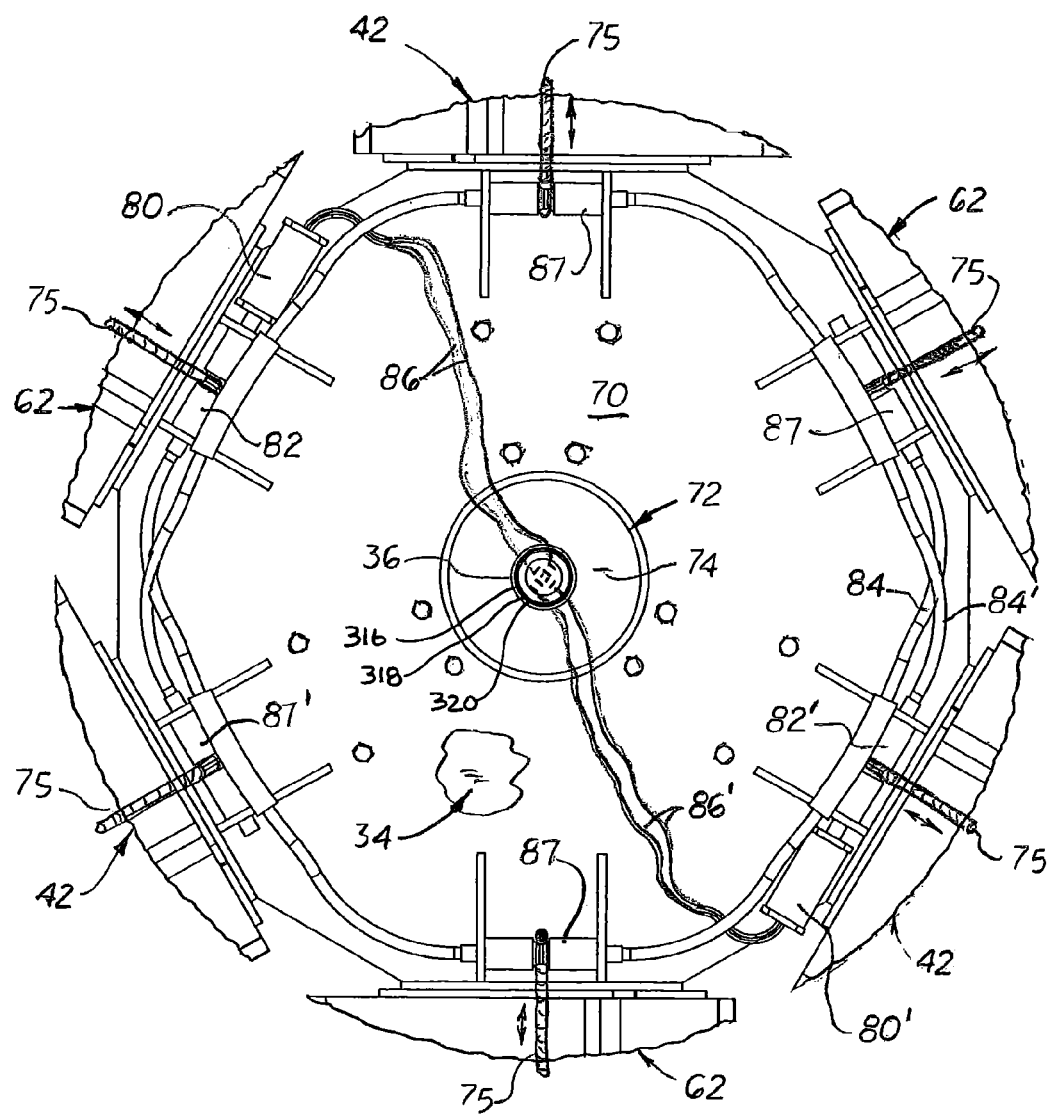
FIG. 10 is a front plan view of the rotor plate.

The two sets of rotor assemblies 40, 60 each include three blades 42, 62, respectively, that are alternatively and evenly spaced apart and extending outward from the rotor plate 70. As shown in FIGS. 9 and 10, the rotor plate 70 is mounted to the front surface of the generator's outer casing 34. The rotor plate 70 includes a center bore 72 in which a center bearing 80 is positioned. Extending through the bearing 80 is the generator's hollow drive tube 36. Extending through the drive tube 36 are motor control wires 86, 86' that connect the two D.C. motors 80, 80', respectively, mounted near the perimeter edge of the rotor plate 70, to a voltage sensor 115 as discussed further below. Also, extending through the drive tube 36 are generator electrical output wires 316, 318, and 320, discussed further below.

Figure 2:
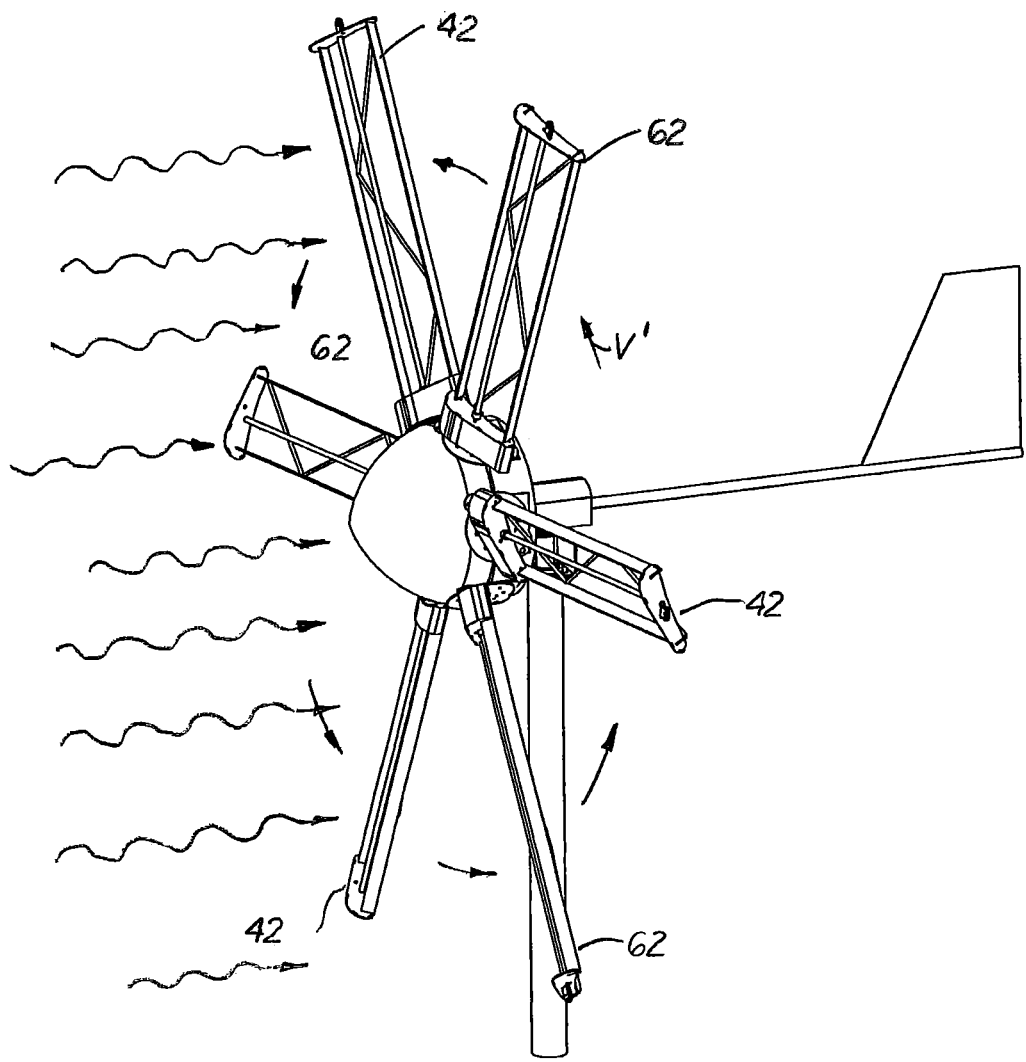
FIG. 2 is a perspective view with the wind generator shown in FIG. 1 showing all six blades collapsed.
Figure 3:
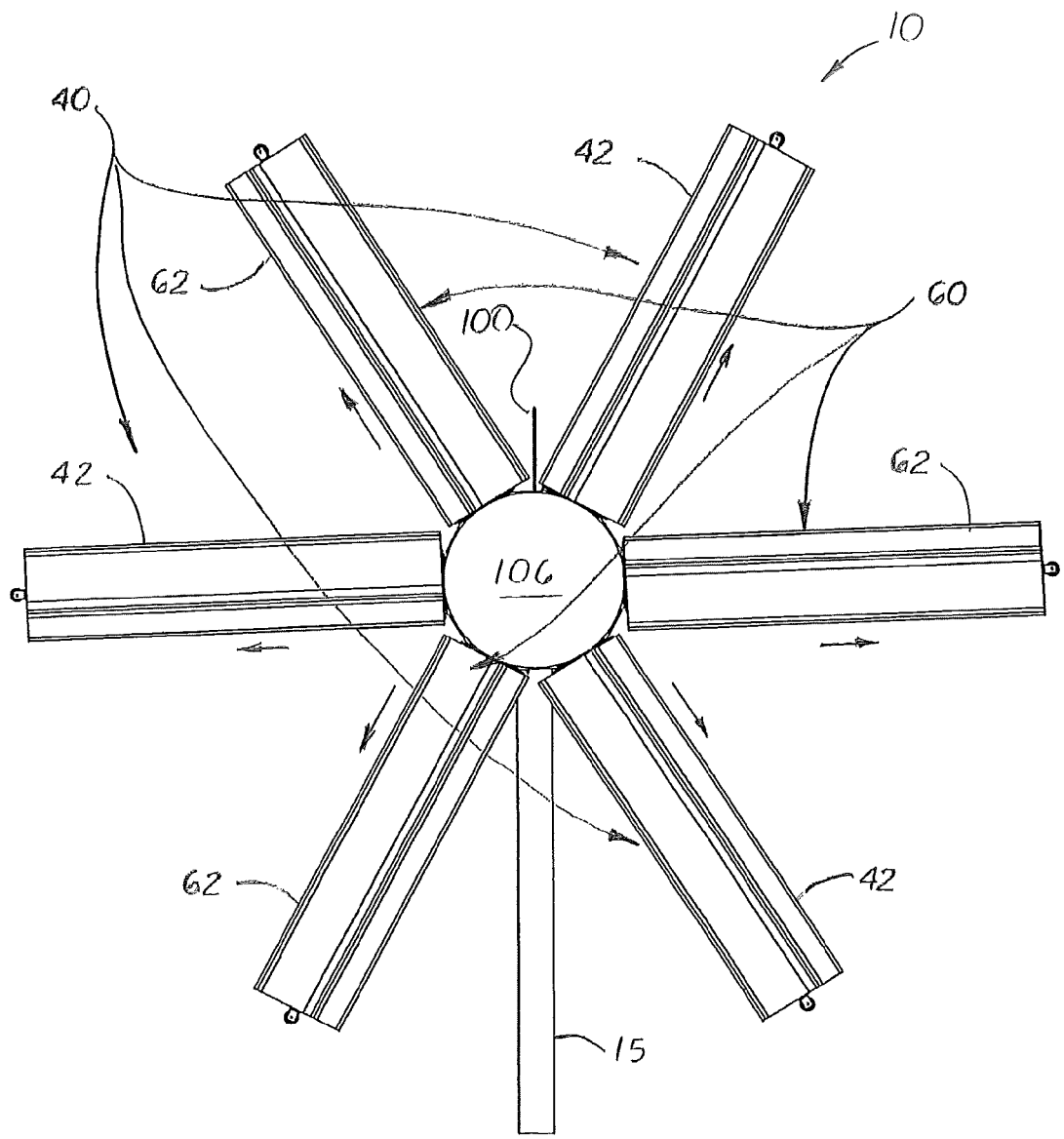
FIG. 3 is front plan view of the wind generator shown in FIG. 1.
Figure 4:
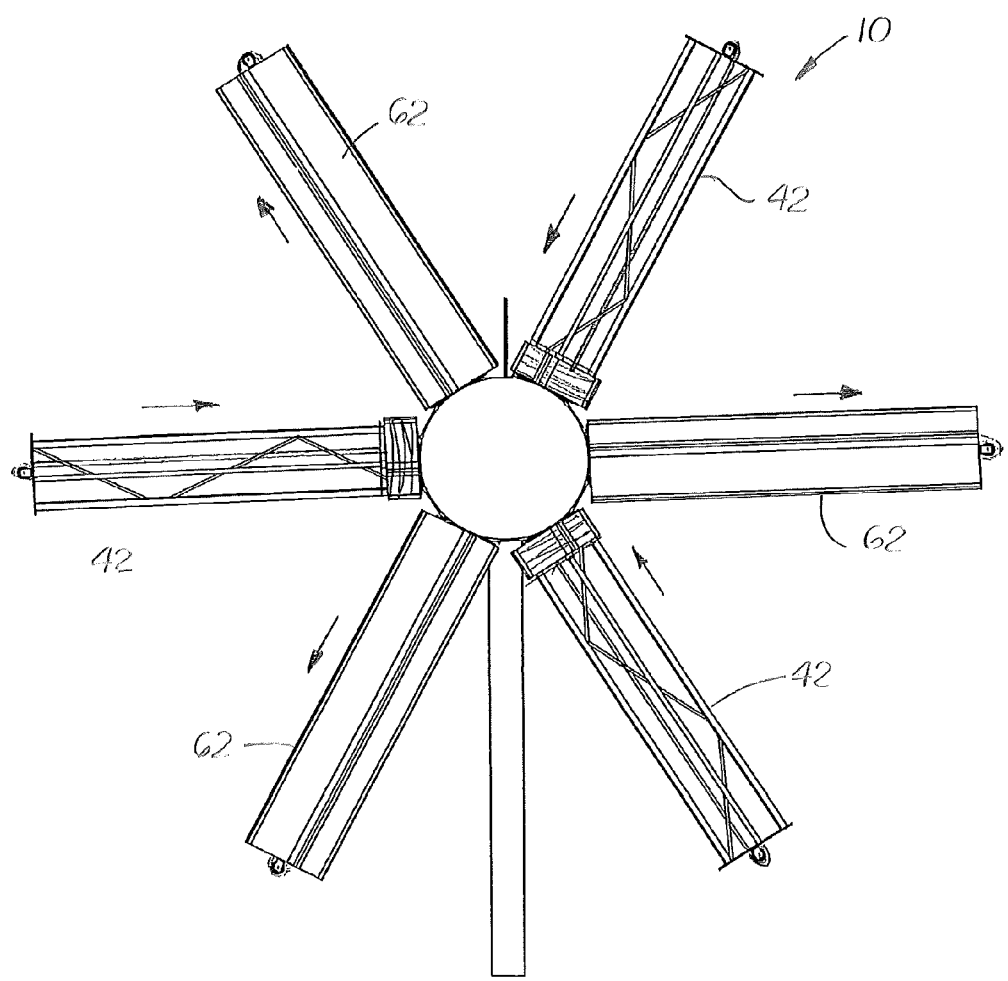
FIG. 4 is a front plan view of the wind generator showing the three blades on one rotor assembly extended and the blades on the other rotor assembly is collapsed.
Figure 5:
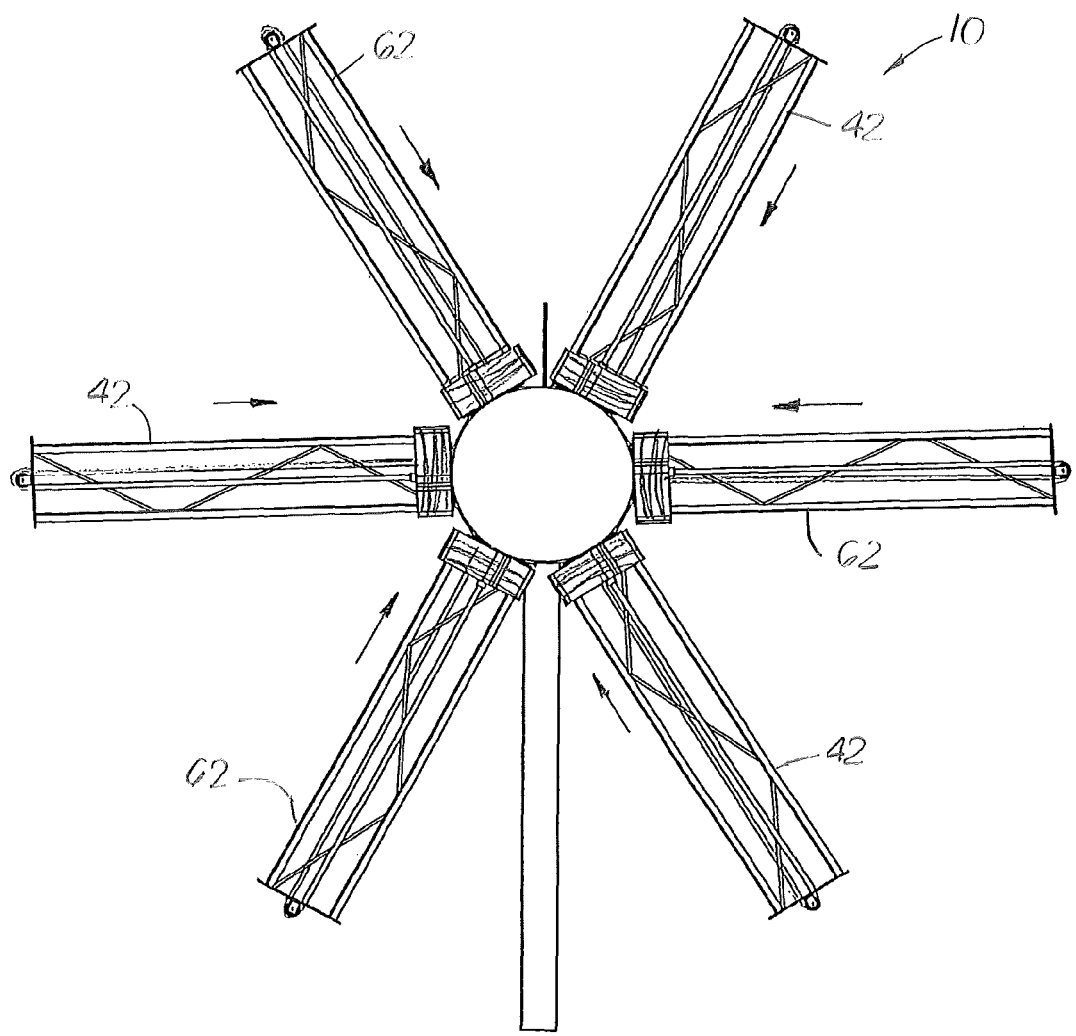
FIG. 5 is a front plan view of the wind generator shown in FIG. 2.

During low winds 110 (3 to 15 mph), the blades 42, 62 on the two rotor assemblies 40, 60, respectively, are fully extended from the rotor plate 70 as shown in FIGS. 1 and 3. During high winds 100' (above 25 mph), the blades 42, 62 on both sets of rotor assemblies 40, 60 are collapsed as shown in FIGS. 2 and 5. During moderate winds (13 to 25 mph), the blades 42 or 62 on at least one rotor assembly 40 or 60, respectively, are collapsed and the blades 42, 62 on the other rotor assembly 40 or 60, respectively, are extended as shown in FIG. 4.

Figure 8:
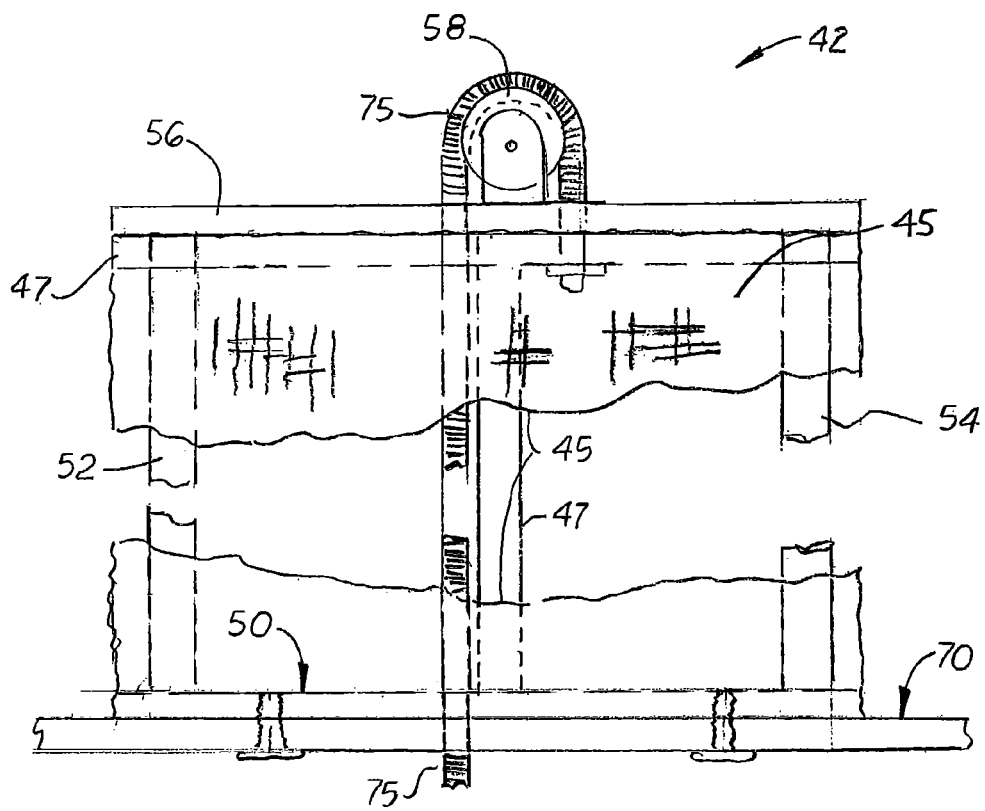
FIG. 8 is a partial, side elevational view of a blade with the flexible body shown in an extended position.

The blades 42 and 62 are designed to product sufficient torque to rotated the generator. In the first embodiment, shown in FIGS. 7 and 8, the blades 42, 62 are identical is size and structure and have an airfoil cross-sectional shape with a rounded leading edge 46 and a thin tailing edge 48. Each blade (only blade 42 is shown in FIG. 8 but should be understood to also describe blade 62) includes a lower mounting plate 50 that attaches to the perimeter edge of the rotor plate 70. Aligned perpendicular and extending outward from each lower mounting plate 50 are three fixed rods 52, 53, 54. Aligned perpendicularly and mounted on the ends of the three rods 52, 53, 54 is outer frame plate 56. Mounted centrally and extending outward from the outer frame plate 56 is a pulley 58. Formed on the outer frame plate 56 on opposite sides of the pulley 58 are two bores through which a semi-rigid cable 75 extends.

Each blade 42 also includes a transversely aligned upper guide plate 47 that slides longitudinally between the plates 50 and 56, and over the three outer fixed rods 52, 53, 54. The distal end of a cable 75 extends downward through a bore on the upper frame plate 56 and connects to the guide plate 47. During assembly, the upper edge of the flexible body 45 encircles and is affixed to the outer perimeter edge of guide plate 47. The lower edge of the flexible body 45 is affixed to the outer perimeter edge to a mounting plate 50. A bore is formed in the mounting plate 50 on the mounting surface through which the cable 75 extends. Each blade 42, 62 includes a flexible cover or body 45 made of nylon or polyethylene terephthalate fabric or polyester film that when extended over the plates and rods forms an enclosed air foil structure that is supported by the guide plate 47 and the mounting plate 50. During operation, the cable 75 forces the guide plate 47 up and down over the three fixed rods 52, 53, 54 to extend or collapse the blade 42.

As shown in FIG. 10, the extending and collapsing movement of the blades 42, 62 are controlled by two D.C. motors 80, 80' mounted on the rotor plate 70 directly under one of the blades 42, 62 in each rotor assembly 40, 60, respectively. Each D.C. motor 80, 80' includes a main pulley 82, 82' connected to its drive shaft 81, 81'. Extending longitudinally from each drive shaft 81, 81' is an intermediate cable 84, 84'. Mounted on the intermediate cable 84, 84' directly under the other blades are pulleys 87, 87', respectively. Attached to the main pulley 82, 82' and to the intermediate cable pulleys 86, 86' are cables 75 that move longitudinally inside the blade 42 to move the guide plate 47 up and down inside the blade 42.

Figure 6:
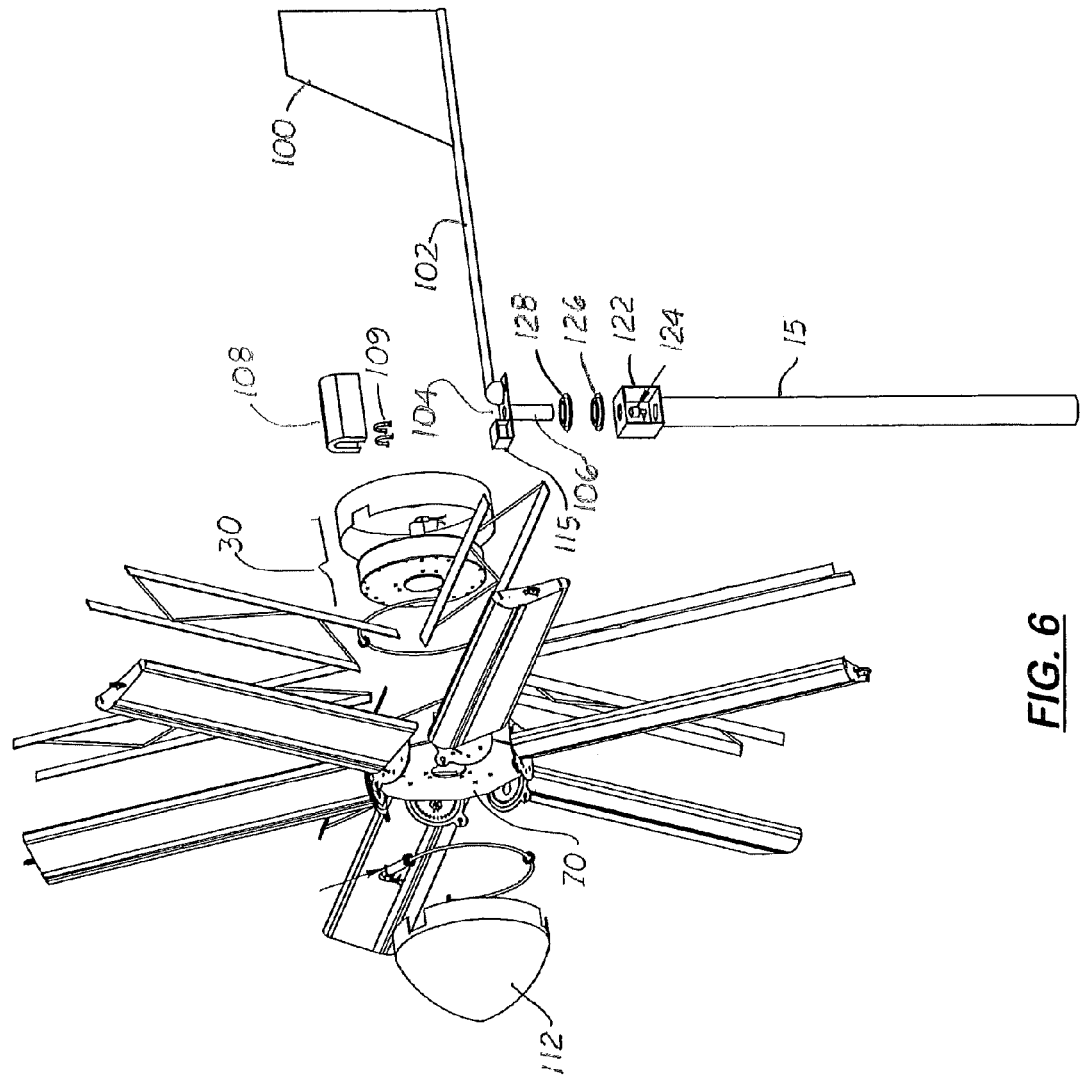
FIG. 6 is an exploded perspective view of the wind generator.
Figure 7:
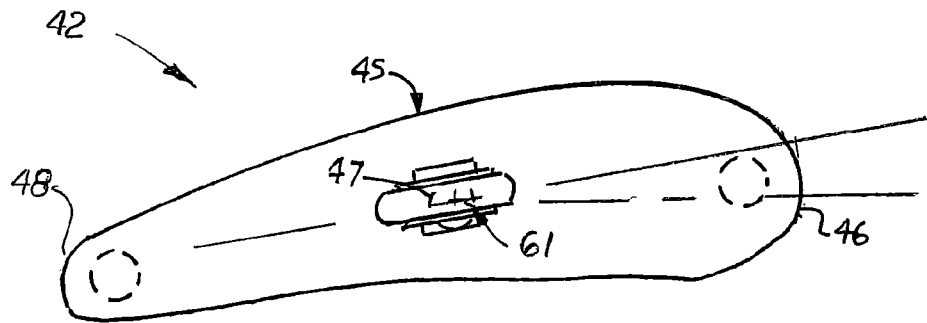
FIG. 7 is a top plan view of a blade.

The two electric motors 80, 80' are connected via two sets of wires 86, 86', respectively, that extend through the generator's drive tube 36 and connected to a voltage sensor 115 mounted on the support pole 15. As shown in FIG. 6, formed on the upper end of the support pole 15 is a hollow box 122. Located inside the box 122 is a slip ring 124 that allows the electrical connections from the generator 30 and the DC motors 82, 82' to wires located inside the vertical pole 15. Disposed over the end of the support pole 15 is a T-shaped bracket 104. The bracket 104 includes a downward extending neck that fits into a bore formed on the box 122. Disposed between the top surface of the box 122 and the bottom surface of the bracket 104 are two bearings 126, 128. Disposed over the bracket 104 is a cover 108. U-shaped staples 109 are used to hold the wires in place on the bracket 104. Mounted over the front surface of the rotor plate 70 is a nozzle 112.

Figure 11:
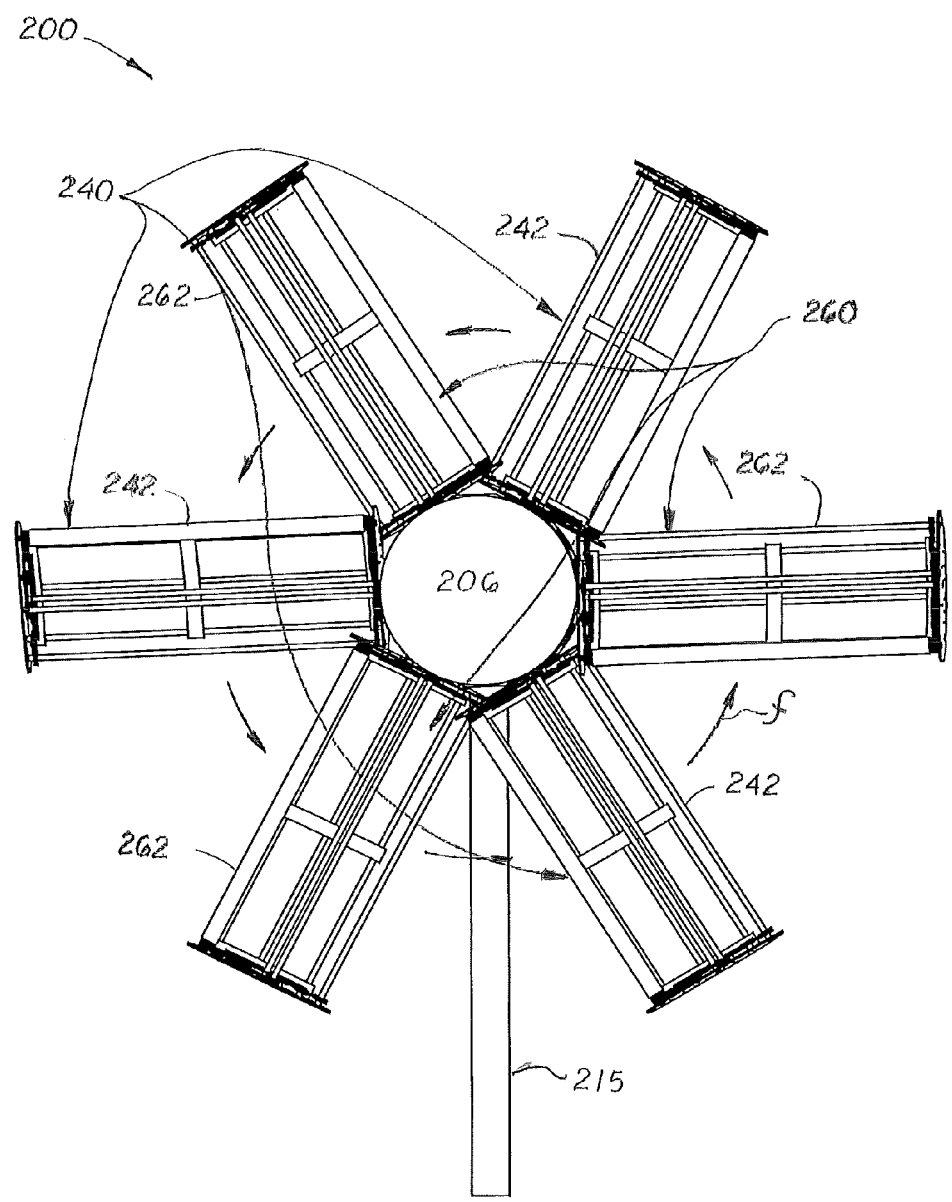
FIG. 11 is a front elevational view of the second embodiment of the collapsible horizontal axis wind generator that uses flexible panels mounted in a roll in a retracted position on one side of the blade frames.
Figure 12:
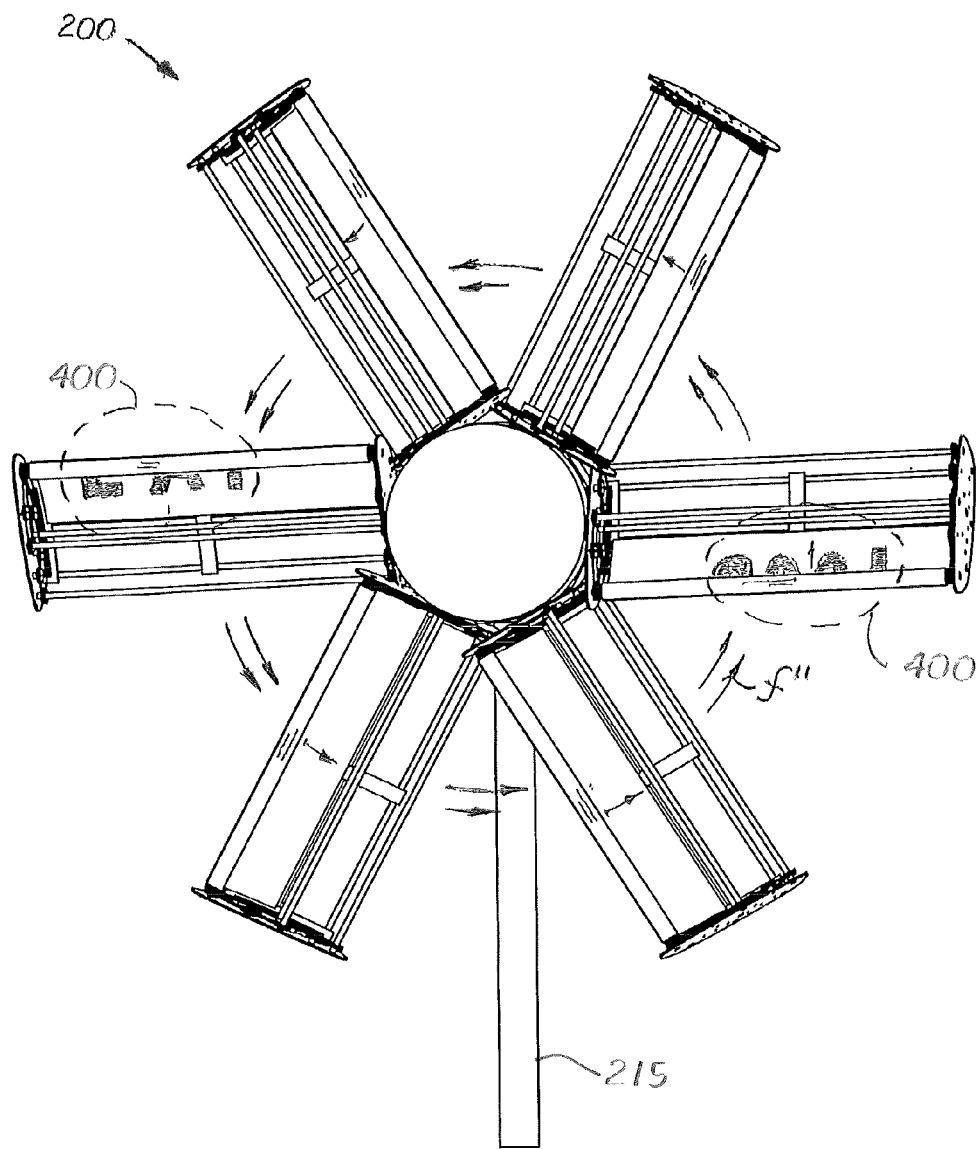
FIG. 12 is a front elevational view of the second embodiment showing the flexible panels mounted in a roll partially unfurled on the blade frames.
Figure 13:
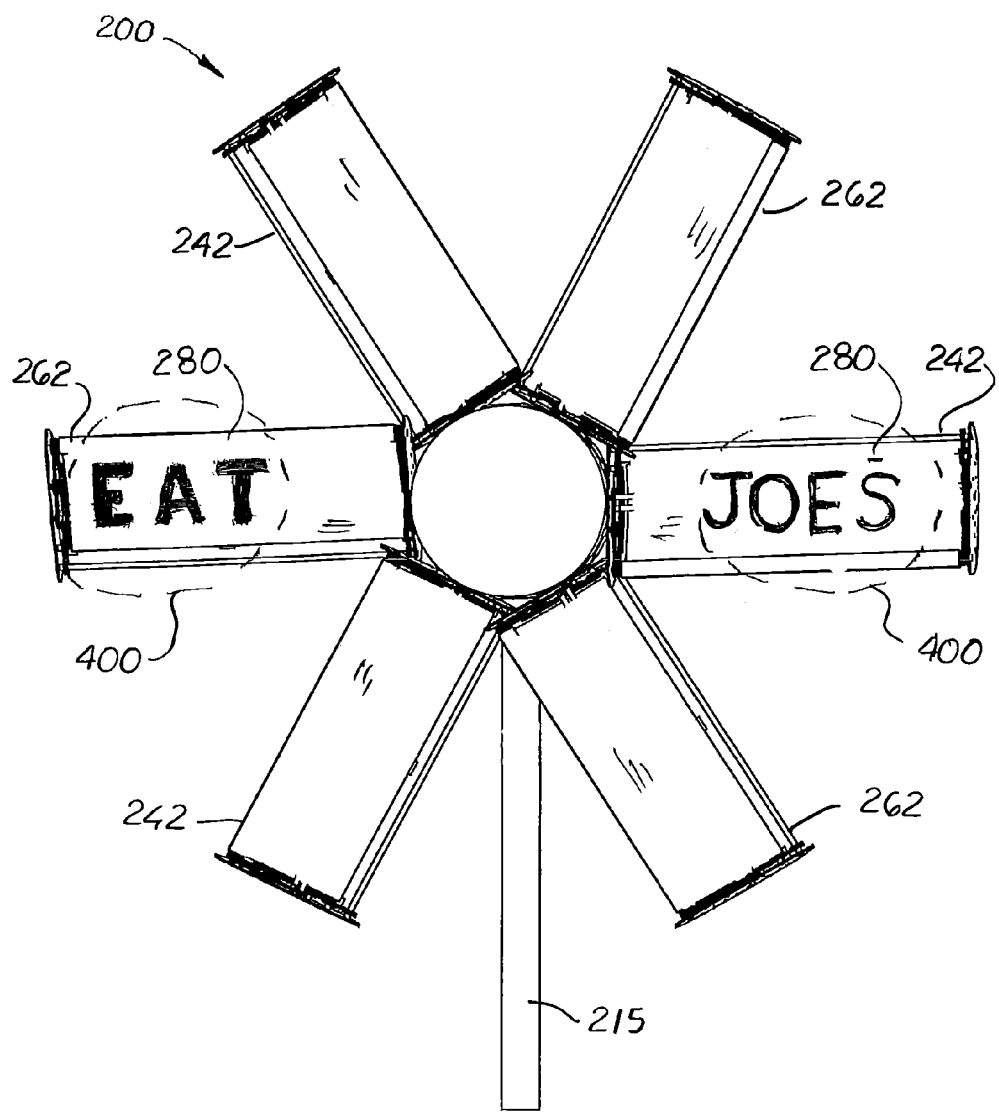
FIG. 13 is a front elevational view of the second embodiment showing the flexible panels on the blades unfurled and fully extended.
Figure 14:
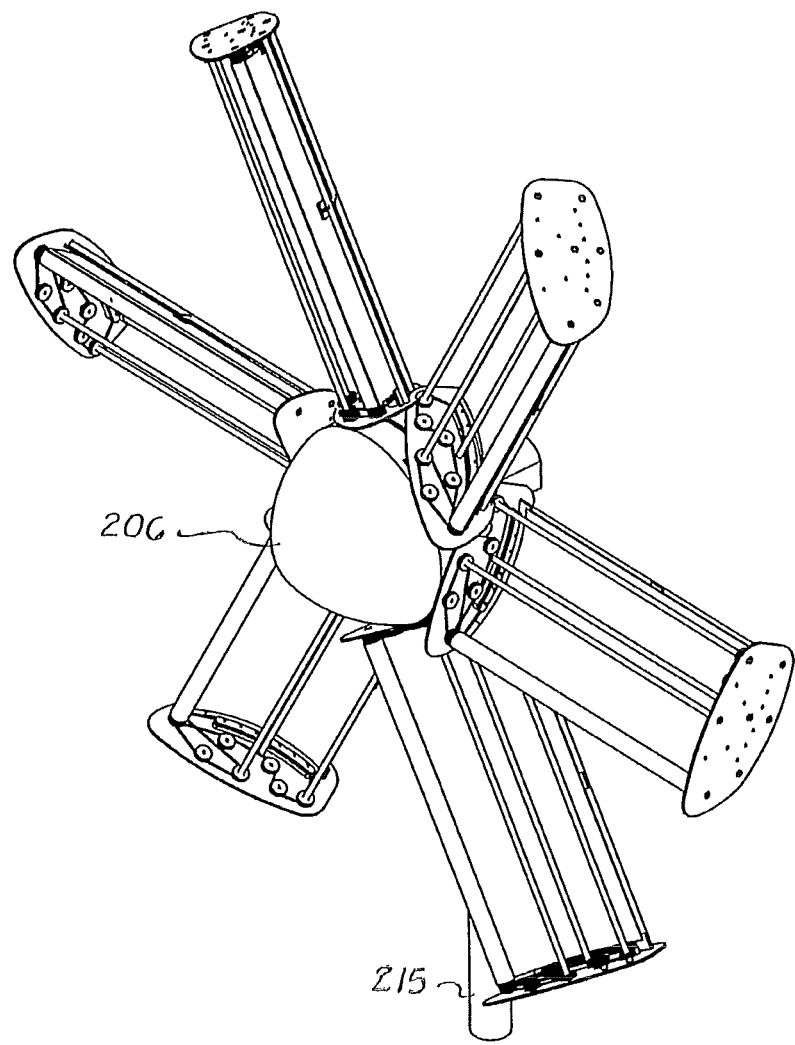
FIG. 14 is a perspective view of the second embodiment of the wind generator shown in FIG. 13.

FIGS. 11-14 show another embodiment of the horizontal axial wind generator 200 that uses two rotor assemblies 240, 260 that use three sail blades 242, 262, respectively, designed to 'cup' the wind rather that cause the wind to aerodynamically flow over the surfaces wihich occurs in blades 42, and 62. Like rotor assemblies 40 and 60, the two rotor assemblies 240 and 260 are designed to rotate around a center hub 206 that is mounted in an elevated position by a support structure, i.e. pole 215. Blades 242 and 262 are identical and include a single flexible cover or panel 280 made of nylon, terephthalate fibric or polyester film or similar film-like material furled and unfurled laterally from an elongated spool or axle 288 located on one side of the blade's rigid frame 244. The flexible panel 280 is aligned parallel to the blade's longitudinal axis and is selectively furl and unfurl over the rigid frame according to input control signals from a control panel. Wind and voltage monitoring sensors are coupled to the control panel. As the flexible panel 280 furls and unfurls, the exposed surface areas of the blades changes causing the sets of blades to rotate at different speeds and generate different amounts of torque. As the flexible panel 280 is unfurled as shown in FIGS. 11-13, the surface areas of the blades, as indicated by the reference letters f, f', f'', respectively.

Figure 17:
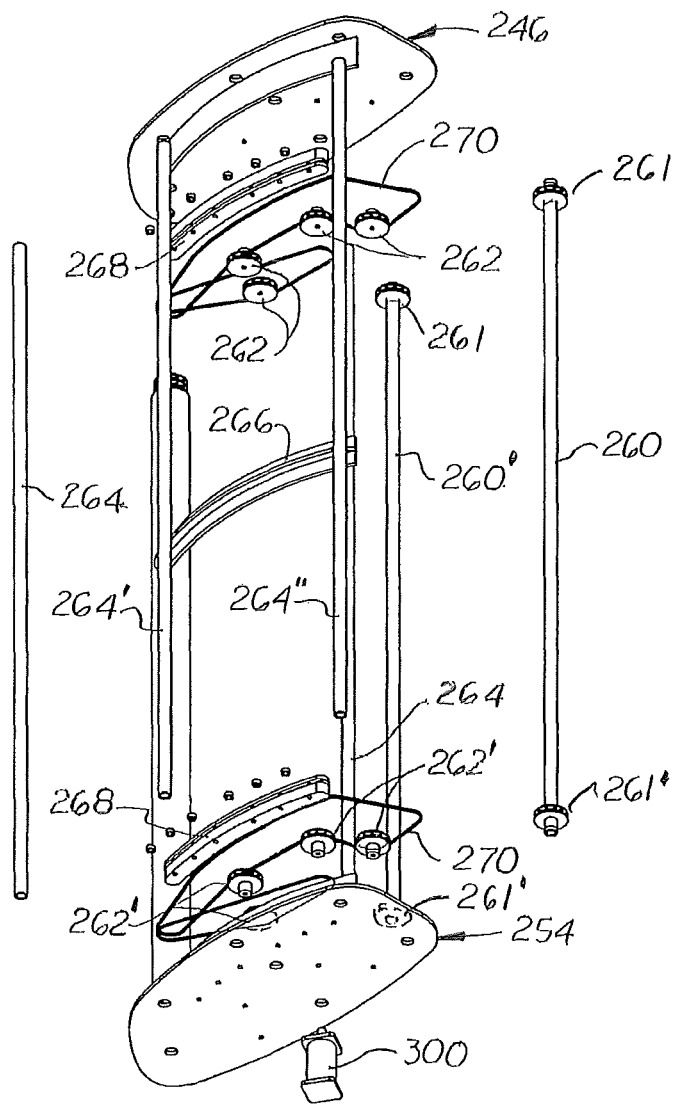
FIG. 17 is an exploded lower perspective view of the blade shown in FIGS. 15 and 16.
Figure 18:
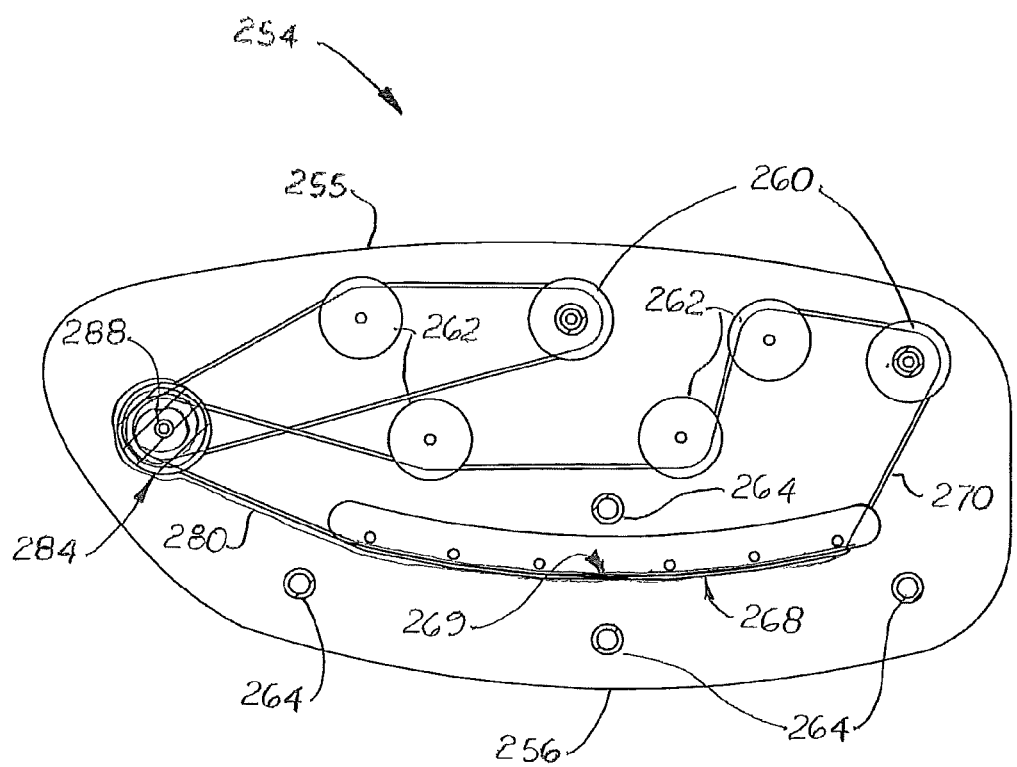
FIG. 18 is a top plan view of the lower plate assembly used on the blade shown in second embodiment of the wind generator.

As shown in FIGS. 15-17, each blade (blade 242 shown) includes a rigid frame 244 that includes a top plate assembly 246 and a lower plate assembly 254. Each plate assembly 246, 254 has an oblong shape with a short straight leading edge 247, 255 and a long curved trailing edge 248, 256, respectively. The top plate assembly 246 and the lower plate assembly 256 are parallel and aligned and registered over each other and securely held apart by elongated support rods 264, 264', and 264". Attached to the inside surface on the top and bottom panel assemblies 246, 254 are four guide sprockets 262, 262'. Perpendicularly aligned and extending between the two plate assemblies 246, 254 are two outer rotating drive axles 260, 260'. Attached to each end of the drive axle 260, 260' is a sprocket 261, 261', respectively. Extending between the trailing edges of the two plate assemblies 246, 254 are three fixed support rods 264, 264', 264".

As shown in FIG. 16, extending between the top and lower plate assemblies 246, 254 and aligned on one side is an elongated spool 288 with the flexible panel 280 wound thereon. During use, the spool 288 rotates and is supported at its opposite ends by the two plate assemblies 246, 254. The opposite ends of the spool 288 is attached to sprockets 289, 289', that engages two belts 270, 270', respectively, that moves back and forth over the sprockets 289, 289' located on each plate assembly 246, 254, respectively. The ends of the two belts 270 are attached to the lower and upper leading edge of the flexible panel 280 which causes the flexible panel 280 to furl and unfurl over the rigid frame 244.

Attached to the inside surfaces of the fixed support rods 264, 264' 264" and adjacent to the inside surface of each panel assembly 246, 254, are two curved end guide rails 268, 268', respectively. Located centrally between the two end guide rails 268, 268' is a central support rail 269. Each end guide rail 268, 268' includes a curved slot that engages the upper and lower edges of the flexible panel 280 thereby causing the flexible panel 280 to assume a slightly concave configuration that 'cups' the wind when unfurling. The end guide rails also hold the upper and lower edges of the flexible panel 280 in place on the rigid frame 244.

During assembly, the two belts 270, 270' are attached to the top and bottom outer corners of the flexible panel 280. The belts 270, 270' is wound around the sprockets 260, 262 and attaches at its opposite ends to the sprockets 289, 289'. Attached to the end of at least one drive axle 269 is an electric motor 300 that causes the sprockets 289, 289' to rotate and move the two belts 270, 270' back and forth and thereby furl and unfurl the flexible panel 280. As stated above, blade 242, 262 is controlled by a separate electric motor 300 which are electrically connected to the control panel.

During use, the wind generators may be aligned so that the wind flows directly against the longest side of the blades 42, 62 or against the outside surface of the blades 242, 262. It should be understood however, that with the second embodiment, the blades 242 and 262 may be rotated 180 so that the inside surface of the flexible panel 280 is in direct contact with the wind causing the flexible panel 280 to operate like a sail.

As shown in FIG. 13, an addition used of the second embodiment of the generator 200 is as a sign or a display. In the second embodiment of the generator 200, the advertising indicia, generally indicated by the reference number 400 may be printed on one or both surfaces of the flexible panel 280 which is viewable when to nearby observers when the blades 242 are unfurled and the rotor assemblies 240 and 260 are stationary. During use, when the wind is too low to rotated the generator 30, the rotor assemblies 240, 260 are rotated on the vertical pole and locked in position so that the general public may see the advertising indicia printed on the face of some or all of the blades enabling the operator to continue to produce revenue from the generator.

Figures 19, 20:
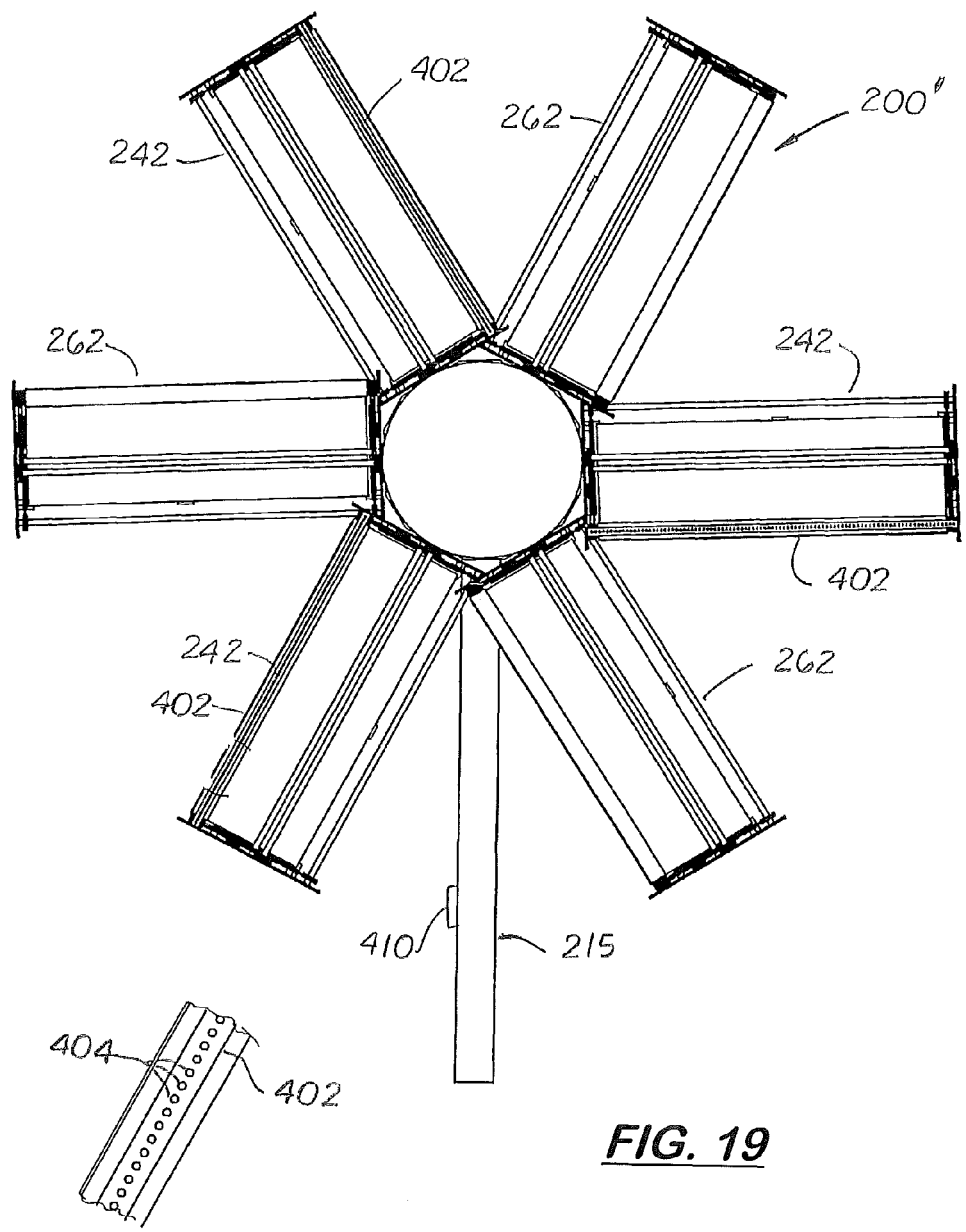
FIG. 19 is a front elevational view of the second embodiment showing the flexible panels on the blades unfurled and with LED bulbs mounted longitudinally one three alternating blade frames.
FIG. 20 is a front elevation view of a blade frame with a plurality of LED bulbs mounted thereon.
Figure 21:
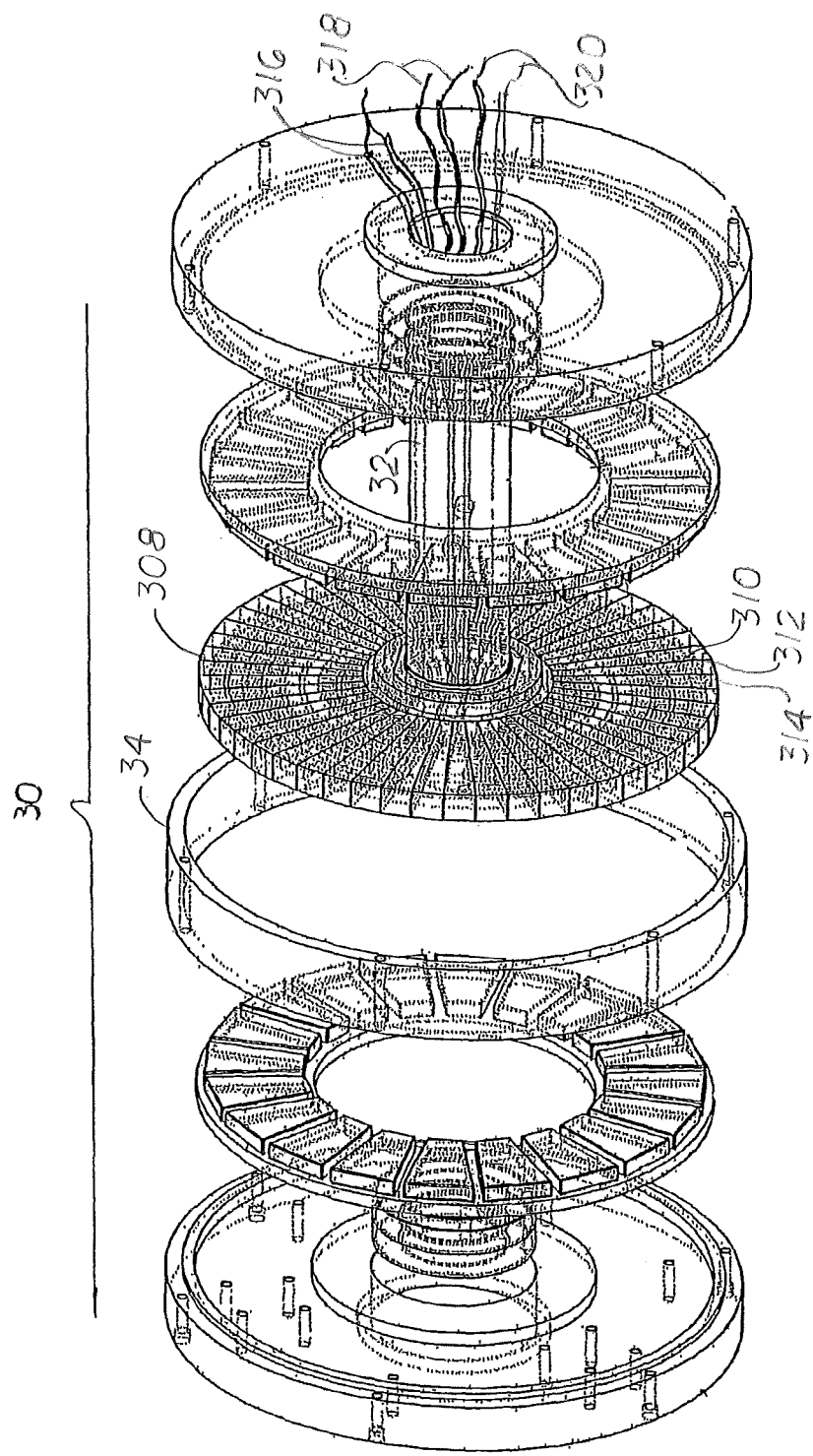
FIG. 21 is an exploded, perspective view of the generator.

FIGS. 19 and 20 are front elevational views of the second embodiment of the generator 200 showing the flexible panels on the blades rolled up or furled and exposing LED strips 402 containing a plurality of LED bulbs 404 mounted longitudinally one three alternating blade frames. The LED bulbs 404 are electrically connected to a control box 410 mounted on the support pole 215. The LED strips 402 may be used with or without the advertising indicia 400 that are visible when the other blades are unfurled.

As stated above, both embodiments are designed to be adjustable for different wind and voltage conditions. In both embodiments, a voltage sensor 115 constantly measures the voltage output of the generator 30. During setup, a software program 606 is used to set the upper and lower voltage threshold amounts for the voltage sensor that control the movement of cables 75 that cause the guide plates 47 to move inward and outward over the two outer rods 52, 54.

The low RPM axle generator 30 used in both embodiments is a high torque, 5 to 10 kw generator substantially identical to the low RPM axial generator disclosed in U.S. patent application Ser. No. 12/228,316, filed on Aug. 11, 2008; Ser. No. 12/698,914, filed on Feb. 2, 2010; and Ser. No. 12/849,445 filed on Aug. 2, 2010; which are now incorporated by reference herein. As shown in FIG. 6, the rotor plate is attached to the outer housing that rotates around a stator disc 308. A shown in FIGS. 9 and 21, the stator disc is mounted on a hollow drive axle 32 that is coaxially aligned with the outer housing 34. As described more clearly in the above referenced patent applications, the stator disc 308 on which a plurality of coil track loops 310, 312, and 314 are radially aligned that are serially connected to three pairs of wires 316, 318, 320 that extend through the end of the drive axle 32 that extends through the outside plate of the ring housing and connect to an optional disconnect switch and rectifier and inverter.

In should be understood that the wind generator disclosed herein is not limited to the low RPM generator shown in the above patent application. Other types high torque, low RPM generators are available today and may be used.

Figure 23:
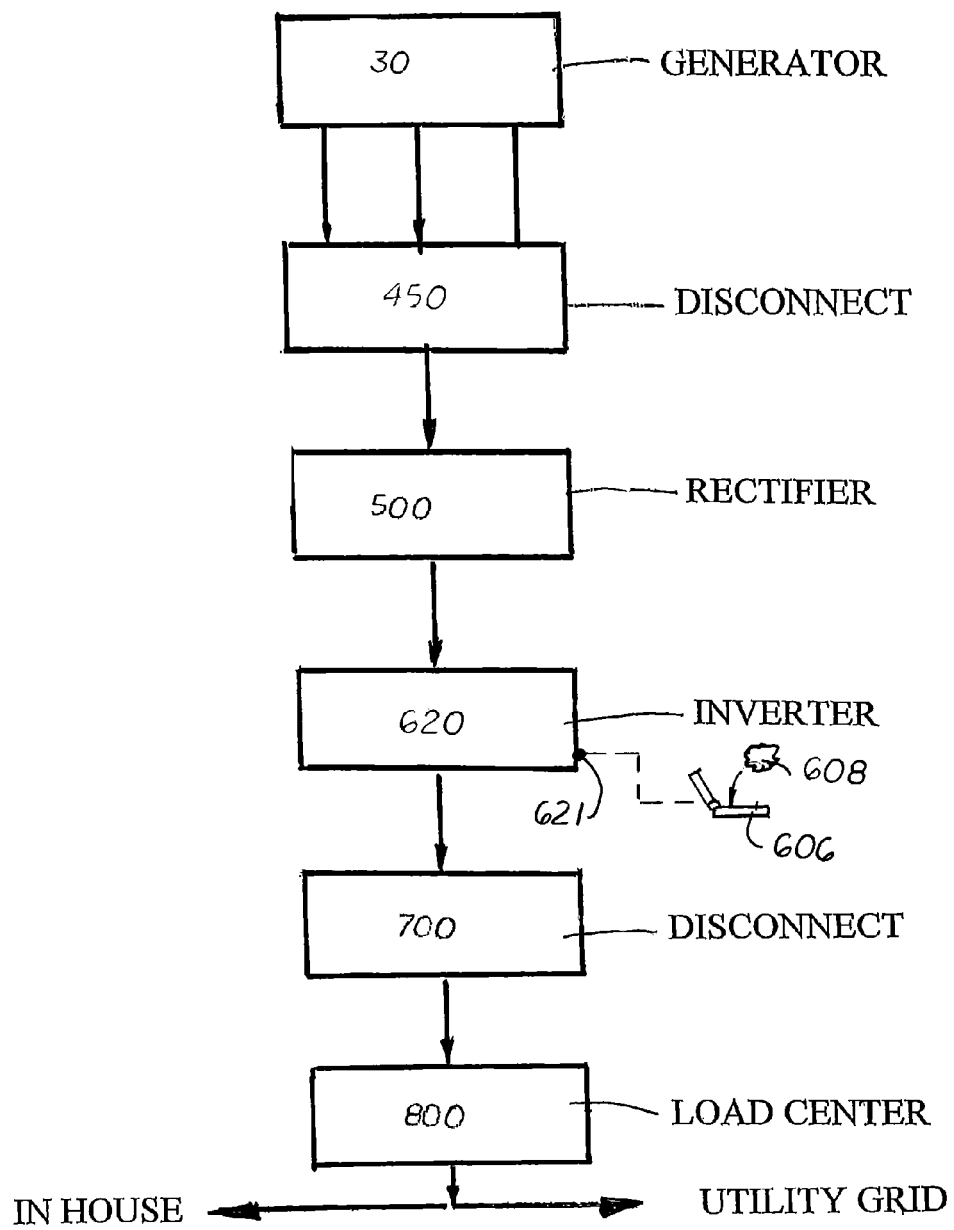
FIG. 23 is a flow diagram showing how the generator connected to the household electrical grid.

As shown in FIG. 23, the generator 30 is connected to an optional disconnect switch 450. The disconnect switch 450 is connected to a rectifier 500 which is connected to an adjustable inverter 620. The inverter 620 includes electronics (hardware) and may be selectively programmed by a software program 608 that allows the operator to adjust the inverter 620 so that a base line measurement (electrical power usage (Watts), and wind velocity) is established and maintained. When initially installed and exposed to outside wind, an energy audit of the old system if first conducted. During the energy audit, the amount of electrical energy used, and the average velocity of the wind are measured. These two parameters provide a baseline for the generator 30. The load on the generator 30 is then adjusted so that the baseline is obtained.

After the energy audit is conducted, a computer 606 (i.e. laptop) with a maximum power point tracking software program 608 (known as a MPPT software program) loaded into its memory. Such programs are commonly available through companies that manufacture electrical inverters. The computer 606 is then connected to a communication port 621 on the inverter 620. The software program 608 then executed and the electrical power, velocity and pressure differentials are then inputted to the computer 606. The software program 608 generates the menu page 625 shown in FIG. 22, and the operator then uses the software program 608 to adjust the amount of load exerted by the inverter so that the generator 30 operates most efficiently.

Figure 22:
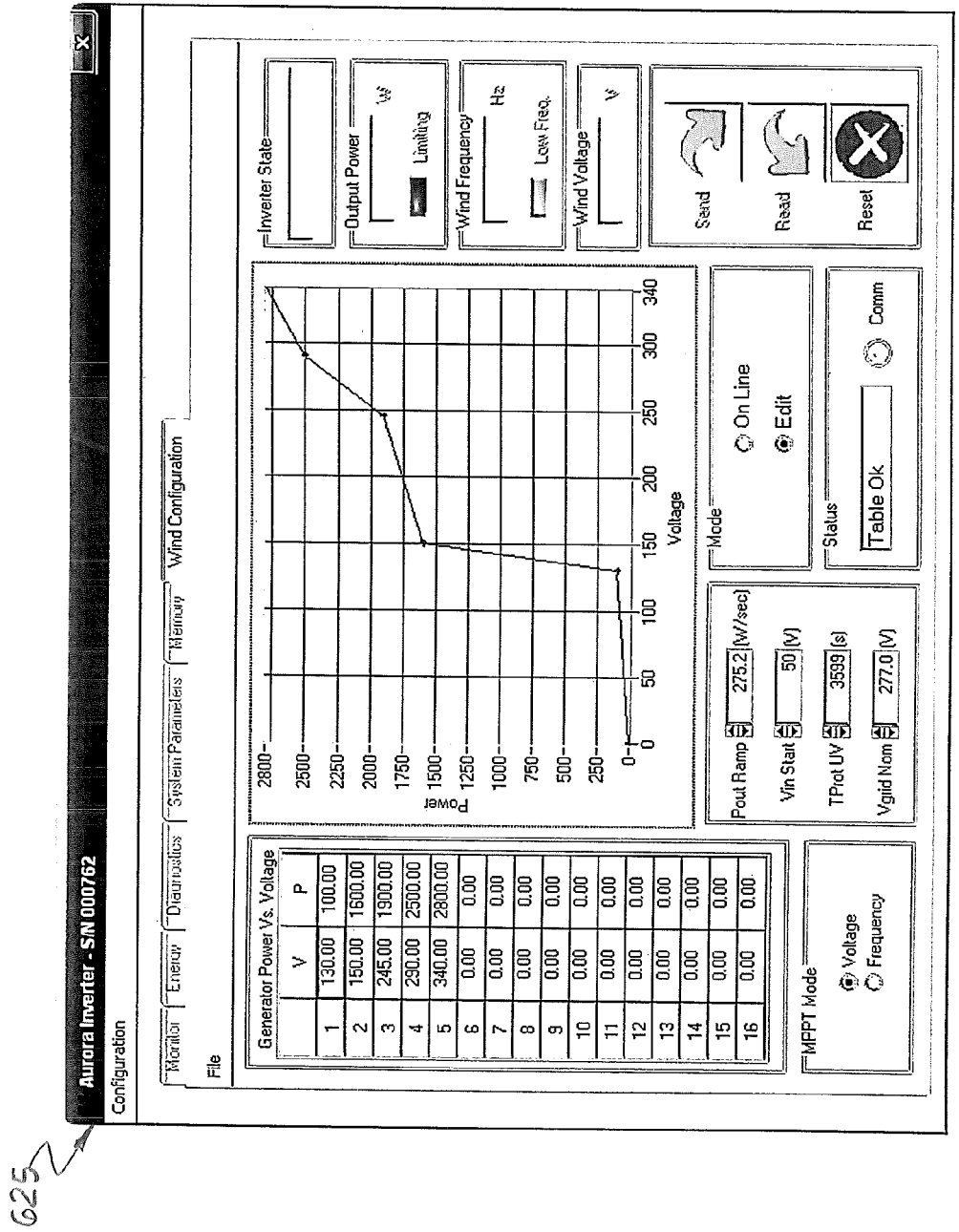
FIG. 22 is an illustration of the menu page generated the maximum power point tracking software program that is used to adjust the load on the generator assembly so it operates efficiently.

FIG. 22 is an illustration of the menu page 625 generated the maximum power point tracking software program 608 that is used to adjust the load on the generator 30 so that it operates efficiently.

As shown in FIG. 23, the invertor 620 is connected to a second disconnect switch 700 and then to a load center 800. The load center 800 is then connected to the utility gird or to the building's electrical system to supply A.C. current thereto.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A horizontal axis wind generator, comprising:
   a. an elevating support structure;
   b. high torque, low RPM, magnetic generator;
   c. a rotating rotor plate mounted on said elevated support structure and exposed to wind, said rotor plate being coupled to said generator that produces electricity by said generator when said rotor plate is rotated;
   d. a plurality of blades radially aligned and attached to said rotor plate, said blades are configured to cause said rotor plate to rotated when exposed to wind, each said blade includes a rigid frame with a top plate assembly, a lower plate assembly and elongated support rods extending between said top plate assembly and said lower plate assembly, said support rods covered by a flexible panel that extends longitudinally and is selectively furled or unfurled laterally over said rigid frame to change the exposed surface area of said blade and generate different amounts of torque; and,
   e. means for controlling the furling or unfurling of said flexible panel on said rigid frame on said blade according to either the velocity of said wind or the amount of said electricity from said generator.

2. The horizontal axis wind generator, as recited in claim 1, wherein each said blade has an airfoil cross-sectional shape.

3. The horizontal axis wind generator, as recited in claim 2, wherein said top plate assembly and said lower plate assembly each include a short straight leading edge and a lower curved trailing edge.

4. The horizontal axis wind generator, as recited in claim 2, wherein said panels include an inside surface and said blades are oriented on said rotor plate so said inside surfaces of said panels face the wind and act as a sail when said panel is unfurled.

5. The horizontal axis wind generator, as recited in claim 3 further including advertising indicia on a surface of said panel when said panel is unfurled.

6. The horizontal axis wind generator, as recited in claim 5 further including an array of LED bulbs on said rigid frame that is visible when said panel is furled.

* * * * *